SEARCH ROOM

Nov. 12, 1957 W. S. DRUZ 2,813,145

SUBSCRIPTION COLOR TELEVISION

Filed March 10, 1954 4 Sheets-Sheet 1

WALTER S. DRUZ
INVENTOR.

BY Francis W. Crotty

HIS ATTORNEY.

WALTER S. DRUZ
*INVENTOR.*

BY Francis W. Crotty

HIS ATTORNEY

SUBSCRIPTION COLOR TELEVISION

WALTER S. DRUZ
*INVENTOR.*

BY Francis W. Crotty

HIS ATTORNEY.

SUBSCRIPTION COLOR TELEVISION

WALTER S. DRUZ
INVENTOR.
BY Francis W. Crotty
HIS ATTORNEY.

United States Patent Office 2,813,145

Patented Nov. 12, 1957

2,813,145

SUBSCRIPTION COLOR TELEVISION

Walter S. Druz, Bensenville, Ill., assignor to Zenith Radio Corporation, a corporation of Illinois Application March 10, 1954, Serial No. 415,209

7 Claims. (Cl. 178—5.1)

This invention pertains to an encoding system for subscription color television and is more particularly directed to a subscription encoding system which operates to encode the color information included in a composite color television signal.

The Federal Communications Commission has adopted certain transmission standards for color television as set forth in the petition of the National Television System Committee, published July 21, 1953. Although the subscription encoding system of the invention is applicable to any color television system in which color information is modulated upon a separately identifiable carrier or subcarrier, it is particularly valuable as applied to a color television transmission of the general type proposed by the NTSC and will be described in that connection. In general, the terms applied to various signals and circuits in the ensuing specification and claims are used in accordance with the meanings and definitions adopted by the NTSC. The term "encoder," however, as used throughout this specification and in the claims, refers to a device utilized either to code a signal to prevent unauthorized reproduction of a subscription telecast or to decode such a secrecy-coded signal; that is to say, "encoding" is used only to refer to either secrecy coding or secrecy decoding. The term "color-intelligence signal" is employed as a generic name for signals relating specifically to chrominance of the televised image; more particularly, the "color-intelligence signals" are the color-difference signals and the carrier color signal. The term "modulator" is employed generically to designate apparatus for combining two signals to derive a signal representative of either their sum or difference frequency.

Many different systems for encoding television signals for subscription purposes have been proposed in the past. These prior art systems, generally speaking, are directed to means for distorting or jamming the entire television signal so that it cannot be reproduced in any intelligible fashion except by authorized receivers which include special decoding apparatus. Moreover, total-distortion systems which are specifically adapted to color television problems have been formulated; systems of this type are described and claimed in the copending application of Walter S. Druz and Erwin M. Roschke, Serial No. 355,718, filed May 18, 1953, and assigned to the same assignee as the present invention. However, none of these prior systems is adapted to encode the color information of a television transmission for secrecy purposes without distorting or altering the luminance information. A selective encoding system which has negligible effect on the luminance portion of the composite color television signal may be highly desirable in that it permits effective collection of a subscription fee based upon utilization of a color telecast without interfering with free utilization of the same program on a monochrome basis. Moreover, selective color encoding, when used in conjunction with independent encoding of the luminance information, makes it possible to establish graded subscription fees which differentiate between color and monochrome reception of the subscription program.

The standards proposed by the NTSC and adopted by the FCC require the local generation at the receiver of a color-reference signal of stable phase and frequency determined by a color-synchronizing signal included as a part of the composite color television signal. Any variation in frequency and even extremely small variations in phase of the color-reference signal lead to substantial distortion of the color values of the reproduced image, so that any apparatus which encodes the chrominance information of the color transmission must be extremely accurate and stable in operation. On the other hand, it is not desirable to utilize an encoding system which requires highly specialized or extremely complex devices and circuits at the receiving end, since the relative cost of such a system as applied to individual subscription receivers would be prohibitive.

It is an object of the invention, therefore, to provide a novel secrecy encoding system for subscription color television which encodes the chrominance information of a color telecast.

It is a further object of the invention to provide a color television secrecy encoding system which is sufficiently stable and precise in operation to permit accurate reproduction of the color values of a transmitted image.

It is a corollary object of the invention to provide a color television secrecy-encoding system which is relatively simple and expedient to construct and economical to manufacture.

A color television secrecy-encoding system constructed in accordance with the invention comprises a pair of color modulators each adapted to modulate a color-intelligence signal with a selected phase component of a color-reference signal to develop a modified color-intelligence signal. The secrecy-encoding system further includes means for applying color-intelligence signals to the color modulators and a color-reference generator for generating a first color-reference signal having a first predetermined frequency. Means are coupled to the first color-reference generator to utilize the first color-reference signal in developing a second color-reference signal which has a predetermined phase and frequency relationship with respect to that first reference signal. A secrecy encoder is employed to selectively couple the color-reference generator and the last-mentioned means to the color modulators. This encoder is actuatable from a first mode of operation in which the first color reference signal is translated to the modulators to a second mode of operation in which the second color-reference signal is applied to the modulators. A control apparatus, coupled to the encoder, is utilized to actuate the encoder between its two modes of operation in accordance with a preselected code schedule.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like reference numerals refer to like elements in all figures, and in which:

Figure 1:
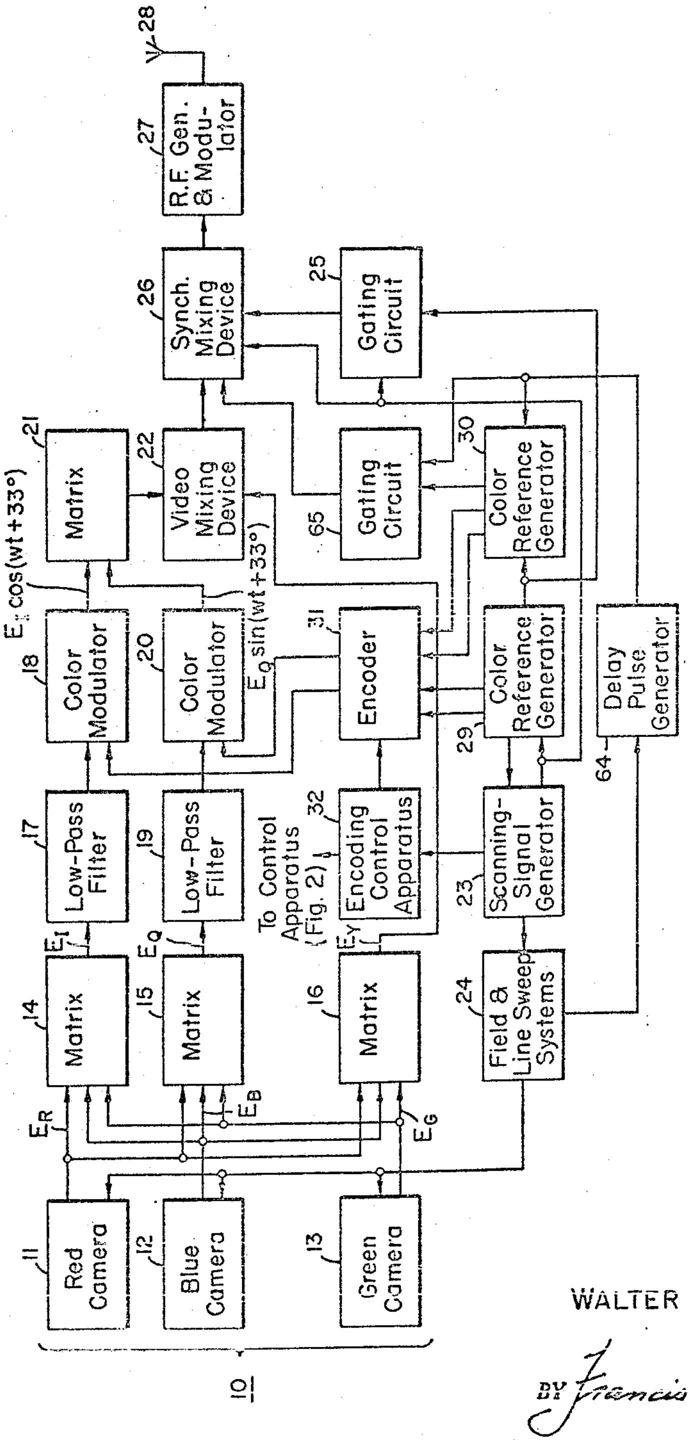
Figure 1 is a block diagram of a color television transmitter which includes a subscription color-encoding system constructed in accordance with the invention.

The color television transmitter illustrated in Figure 1 comprises a camera system 10 which may include three separate color television cameras designated as red camera 11, blue camera 12, and green camera 13. It will be understood that any single camera or camera system capable of analyzing an image in terms of additive primary colors, usually taken as red, blue and green, may be employed. The output stage of camera 11 is coupled to three matrices 14, 15 and 16; similarly, cameras 12 and 13 are each coupled to the same three matrices. Matrix 14 is coupled through a low-pass filter 17 to a first color modulator 18, whereas matrix 15 is coupled through a low-pass filter 19 to a second color modulator 20. Modulators 18 and 20 are coupled to a matrix 21, the output of which is connected to a video mixing device 22; matrix 16 is also coupled to mixing device 22.

The transmitter further includes a scanning-signal generator 23 which is connected to field and line sweep systems 24; the sweep systems are coupled to color cameras 11, 12 and 13. Scanning-signal generator 23 is also interconnected with a first color-reference generator 29. The outputs of scanning-signal generator 23 and color-reference generator 29 are separately coupled to a gating circuit 25, and generator 23 is also coupled to a synchronizing-signal mixing device 26. Video mixer 22 is also coupled to synchronizing-signal mixer 26. Mixing device 26 is coupled to a radio-frequency generator and modulator 27 which is connected to an antenna 28.

The transmitter of Figure 1, as thus far described, is entirely conventional and, if color-reference generator 29 were connected to color modulators 18 and 20, would represent a color television transmitter adapted to develop and radiate a color television signal in accordance with the recently adopted standards. Because this part of the apparatus is quite conventional, only a relatively brief description of its operation is deemed necessary. Cameras 11, 12 and 13 analyze the image to be transmitted in terms of three additive primary colors, here taken as red, blue and green. Scansion of the image is controlled by signals developed in sweep systems 24, the sweep-signal frequencies being in turn controlled by a constant-frequency signal developed in generator 23. The signal developed by generator 23 may correspond in frequency to the line-scanning frequency, which according to present standards, is approximately 15,734 cycles per second. The field-scanning rate, according to the standards, is approximately 60 cycles per second.

In accordance with standard terminology, the output signals from cameras 11, 12 and 13 may be designated as primary color signals $E_R$, $E_B$, and $E_G$ respectively. These three signals are separately supplied to matrix 14, wherein they are additively combined to form a color-difference or color-intelligence signal designated as $E_I$ in accordance with the following relationship:

$$(1) \qquad E_I=0.60E_R-0.32E_B-0.28E_G$$

The same three primary color signals are also supplied to matrix 15, wherein they are additively combined to form a second color-difference or color-intelligence signal $E_Q$, as follows:

$$(2) \qquad E_Q=0.31E_B+0.21E_R-0.53E_G$$

In matrix 16, the three camera signals are combined to form a luminance signal $E_Y$ in accordance with the relationship:

$$(3) \qquad E_Y=0.30E_R+0.59E_G+0.11E_B$$

The constants in Equations 1, 2, and 3 are proportioned to conform these signals to the presently accepted standards, and of course may be changed to meet future variations in the standards, if any, without departing from the invention in any way. Moreover, it should be understood that color-intelligence signals $E_I$ and $E_Q$ may be developed by first synthesizing color-difference signals of the general form $E_R-E_Y$ and subsequently combining such color-difference signals with luminance signal $E_Y$ in accordance with known techniques.

Color-difference signals $E_I$ and $E_Q$ are supplied to color modulators 18 and 20 respectively; the bandwidths of the two color-difference signals are restricted to approximately 1.5 megacycles per second and 0.5 mc. by filters 17 and 19 respectively. In the color modulators, the color-difference signals are modulated with a subcarrier having a frequency equal to an odd integral multiple of one-half the line-scanning frequency; this color-reference or color-subcarrier signal is developed by generator 29 and is supplied in phase quadrature to the two color modulators. The modified color-intelligence signals appearing at the outputs of color modulators 18 and 20 may be expressed as $E_I \cos(wt+33°)$ and $E_Q \sin(wt+33°)$ respectively, where $w$ is taken as $2\pi$ times the frequency of the color-reference signal.

In matrix 21, the modified color-intelligence signals are additively combined to form a carrier color signal $E_C$ which may be expressed as:

$$(4) \qquad E_C=E_I \cos(wt+33°)+E_Q \sin(wt+33°)$$

the carrier color signal is then applied to mixing device 22 and is combined therein with the luminance signal $E_Y$ to form a color picture signal $E_M$ having the following composition:

$$(5) \qquad E_M=E_Y+E_C$$

The color picture signal $E_M$ developed in mixer 22 is supplied to mixing device 26 and is combined therein with conventional scansion-synchronizing signals derived from generator 23 and wtih short bursts of color-synchronizing signals supplied from color-reference generator 29 through gating circuit 25. The resulting composite color television signal is applied to circuit 27 wherein it may be amplified and modulated upon a radio-frequency carrier prior to radiation by antenna 28.

The foregoing explanation and derivation of the signals developed in the transmitter of Figure 1 is substantially simplified in order to avoid unduly encumbering the specification. For example, it will be recognized that gamma-correction of the signals has been omitted. Moreover, no description of the audio system of the transmitter is included, since it has no bearing on the present invention.

In accordance with the invention, the transmitter of Figure 1 further includes a second color-reference generator 30 which is coupled to the output of generator 29. Color-reference generators 29 and 30 are each coupled to a secrecy encoder 31, the output of which is coupled to modulators 18 and 20. The transmitter further includes an encoding control apparatus 32 which may be connected to the output of scanning generator 23 and is also coupled to encoder 31. A delay pulse generator 64 is coupled to the output of sweep systems 24; the output stage of generator 64 is coupled to a gating circuit 65. Gating circuit 65 is also coupled to the output of second color reference generator 30 and to the input stage of mixing device 26.

In operation, second color-reference generator 30 utilizes the first color-reference signal generated by unit 29 to develop a second color-reference signal having a frequency different from that of the first color-reference signal. However, the frequency of the second color-reference signal is not independent of the first color-reference signal; rather, there must be a fixed frequency and phase relationship between the two color-reference signals, and the frequency of the second color-reference signal should preferably be smaller than twice and greater than one-half that of the first color-reference signal in order to comply with the bandwidth limitations of the NTSC type of color television system. The two color-reference signals are each continuously supplied to encoder 31, which may comprise a simple electronic switch or other suitable type of switch. Encoder 31 is actuable from a first mode of operation, in which only the first color-reference signal (developed by generator 29) is translated to modulators 18 and 20, to a second mode of operation, in which only the second color-reference signal (developed by generator 30) is supplied to the modulators. The instantaneous operational mode of encoder 31 is controlled by apparatus 32, which actuates the encoder in accordance with a preselected code schedule. In the embodiment illustrated, coding changes may be effected during field- or line-synchronizing intervals, being synchronized with the retrace intervals by means of the signals supplied from generator 23. The simplest and most economical type of encoding, insofar as the apparatus required is concerned, comprises switching the color-reference signals for randomly selected image fields; however, more complex code schedules may be employed if desired. The specific circuits or structures employed for encoder 31 and control apparatus 32 may be of any suitable type; specific examples of suitable units are disclosed and claimed in Patent No. 2,547,598 to Erwin M. Roschke, issued April 3, 1951, and in the copending applications of George Morris, Serial Number 281,418, filed April 9, 1952, of Carl Eilers, Serial Number 291,714, filed June 4, 1952, and of Jack E. Bridges, Serial Number 326,107, filed December 15, 1952, all of which are assigned to the same assignee as this application. It should be noted that the code schedules for these different types of encoding control apparatus are not necessarily inflexibly fixed, but are preselected only in the sense that the means for establishing the code schedule and the manner of operation thereof are determined beforehand.

It is not necessary or desirable to transmit more than one color synchronizing signal during horizontal retrace intervals, the time selected in accordance with present standards for the transmission of color synchronizing information. However, it may be necessary to provide the receiver with some additional information in order to permit the receiver to generate a second color-reference signal having the proper phase relationship with respect to the second color reference signal developed by generator 30. For this purpose, the second color reference signal (developed in generator 30) is applied to gating circuit 65; the gating circuit is normally non-conductive. Vertical retrace pulses are supplied from sweep system 24 to delay pulse generator 64, which generates a gating pulse of substantial duration delayed to occur during the vertical retrace interval immediately following the vertical drive pulses. The gating pulse signal from generator 64 is employed to render circuit 65 conductive only during those portions of the vertical retrace interval immediately following the vertical drive pulses, so that during this time an extended burst of the second color-reference signal is supplied to mixing device 26 for incorporation in the composite color telecast.

Figure 2:
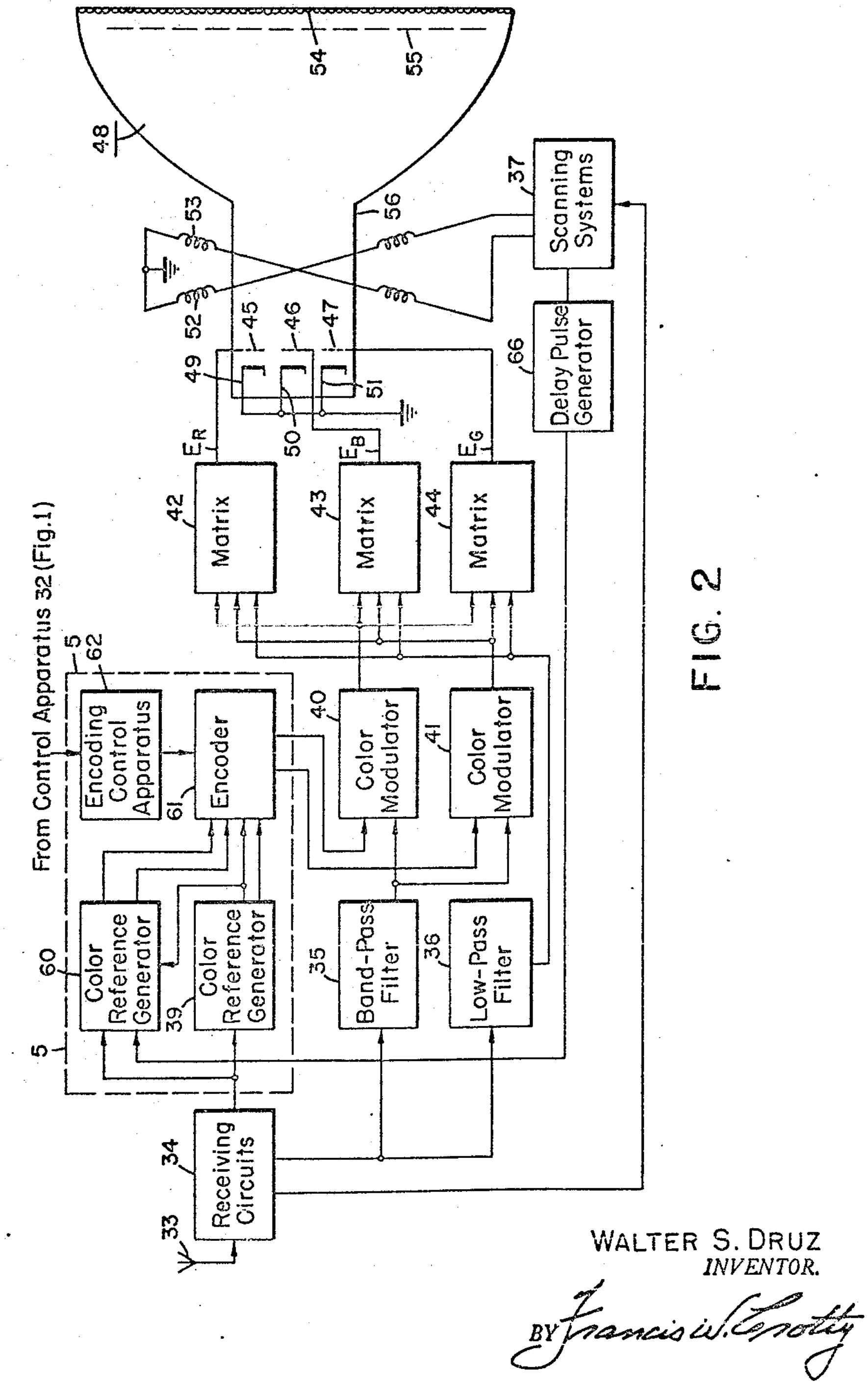
Figure 2 is a block diagram, partially schematic, of a subscription color television receiver comprising a secrecy-encoding system in accordance with the invention.

The receiver illustrated in Figure 2, which is adapted to reproduce the secrecy-coded color telecast radiated by the transmitter of Figure 1, comprises an antenna 33 connected to a receiving circuit unit 34. Receiving circuits 34 may be of conventional design and may comprise a radio-frequency amplifier of any desired number of stages, a first detector, intermediate-frequency amplifying circuits, a second detector, and any desired number of stages of video-frequency amplification. The output stages of receiving circuits 34 are connected to a first color-reference generator 39, to a band pass filter 35, to a low-pass filter 36, and to the receiver scanning systems 37. Band-pass filter 35 is coupled to a pair of color modulators 40 and 41, and the output stages of the two modulators are coupled to three matrices 42, 43 and 44. The output stage of low-pass filter 36 is separately coupled to each of the three matrices 42–44. Matrices 42, 43 and 44 are in turn connected to three control electrodes 45, 46 and 47 of a color image reproducer 48. The illustrated image reproducer, which has been greatly simplified in the drawing, includes three cathodes 49, 50 and 51 individually operatively associated with control electrodes 45, 46 and 47 to develop three separate electron beams. Reproducer 48 further includes two sets of deflection coils 52 and 53 which are connected to scanning systems 37. A color target comprising a multi-color fluorescent screen 54 and a parallax mask 55 is disposed at the opposite end of the image reproducer envelope 56 from the beam-producing electrodes. The structural details of the illustrated reproducer, as well as alternative types of color image reproducers, are well-known in the art and require no further explanation.

If color-reference generator 39 were connected to color modulators 40 and 41, the receiver of Figure 2 would be entirely conventional. In operation, the color television signal intercepted by antenna 33 is demodulated and amplified in receiving circuits 34 to develop a composite color video signal including luminance and chominance information as well as synchronizing signals but not including the radio-frequency carrier. The color-synchronizing signal portions are utilized in generator 39 to develop a color-reference signal having a frequency equal to that of the color-reference signal developed by generator 29 of Figure 1 and having a fixed phase relationship with respect thereto; in conventional color receivers, the reference signal developed by generator 39 is continuously supplied in phase quadrature to modulators 40 and 41. The portion of the composite color television signal comprising the carrier color signal is supplied through band-pass filter 35 to modulators 40 and 41 and is modulated therein with the two quadrature-phased components of the color-reference signal to reproduce color-intelligence signals $E_I$ and $E_Q$ in known fashion. The color-intelligence signals are each supplied to matrices 42, 43 and 44 and are combined therein with the signal from low-pass filter 36, which generally represents luminance signal $E_Y$. Matrices 42, 43 and 44 may be constructed to combine the input signals in the proper polarities and relative amplitudes to synthesize primary color signals $E_R$, $E_B$, and $E_G$ respectively; the proper combining ratios and polarities are known in the art and need not be repeated here. Each of the primary color signals may then be employed to control the intensity of one of the electron beams developed in image reproducer 48. The three electron beams are scanned across target 54, 55 by means of deflection signals developed in scanning systems 37 and applied to deflection coils 52 and 53.

The receiver of Figure 2 includes a secrecy encoding system, used for decoding purposes, which is essentially similar to the transmitter encoding system illustrated in Figure 1. The receiver encoding system comprises a second color-reference generator 60 which is coupled to the output of color-reference generator 39; the outputs of both color-reference generators are coupled to an encoder 61. Second color-reference generator 60 is also coupled to the output of receiving circuits 34 and to a delay pulse generator 66; pulse generator 66 is coupled to the vertical output stage of unit 37. Encoder 61 is also coupled to an encoding control apparatus 62, and the output stage of the decoder is coupled to color modulators 40 and 41.

In operation, color-reference generator 60 utilizes the first color-reference signal (developed in generator 39) to produce a second color-reference signal of a frequency less than twice and greater than one-half that of the first color-reference signal; the frequency and phase of the color-reference signal developed in generator 60 must bear the same relationship to the signal produced by generator 39 as exists between the color-reference signals developed in generators 30 and 29 of the transmitter of Figure 1. Moreover, for intellibigle color reproduction it is necessary that encoder 61 be operated in accordance with the same code schedule as is transmitter encoder 31; consequently, it is necessary that control apparatus 62 follow the same code schedule as transmitter control apparatus 32. To this end, key signals representative of the code schedule may be translated between the two encoding control devices 32 and 62 by means of a transmission line linkage, such as a telephone line, or may be transmitted as a part of or in conjunction with the television broadcast. Alternatively, co-ordination of the code schedules of the transmitter and receiver may be achieved by means of punched-card code schedule devices or similar apparatus. Because there are a wide variety of means for keying the coding control apparatus of a receiver to operate in accordance with a code schedule utilized at the transmitter, and because the type of control used is immaterial insofar as the invention is concerned, no specific code-control linkage is illustrated in the drawings. Under the control of apparatus 62 and encoder 61, the color-reference signal supplied to the color demodulators 40 and 41 always corresponds in frequency and phase to the color reference signal utilized to form the carrier color signal at the transmitter. The vertical drive signals developed in system 37 are employed in generator 66 to develop gating pulses delayed in time with respect to the vertical drive signals by a time interval corresponding to that of generator 64 of Figure 1. The delayed gating pulses actuate a gating circuit in generator 60 in time coincidence with the second color-reference synchronizing signals included in the coded telecast so that generator 60 may be locked in phase with color-reference generator 30 (Figure 1).

As previously indicated, even minor deviations in the frequency and/or phase of the color-reference signal developed at the receiver with respect to the subcarrier employed at the transmitter may result in serious color contamination. Consequently, the change in color subcarriers renders all color information included in the telecast completely unintelligible to an unauthorized receiver. However, the chrominance information represented by carrier color signal Ec has no appreciable effect upon the image when reproduced in black and white, whether that reproduction is carried out by a conventional monochrome receiver or by a color receiver in which the chrominance channels have been rendered inoperative. Consequently, the secrecy encoding system of the invention permits coding of the color information without distorting the basic form and brightness of the image to be reproduced, thereby making it possible to base a subscription fee upon the use of the color information itself. Of course, the encoding system of the invention may be employed conjointly with other systems which distort luminance values in the reproduced image to provide secrecy with respect to both color and black-and-white reproduction.

Figure 3:
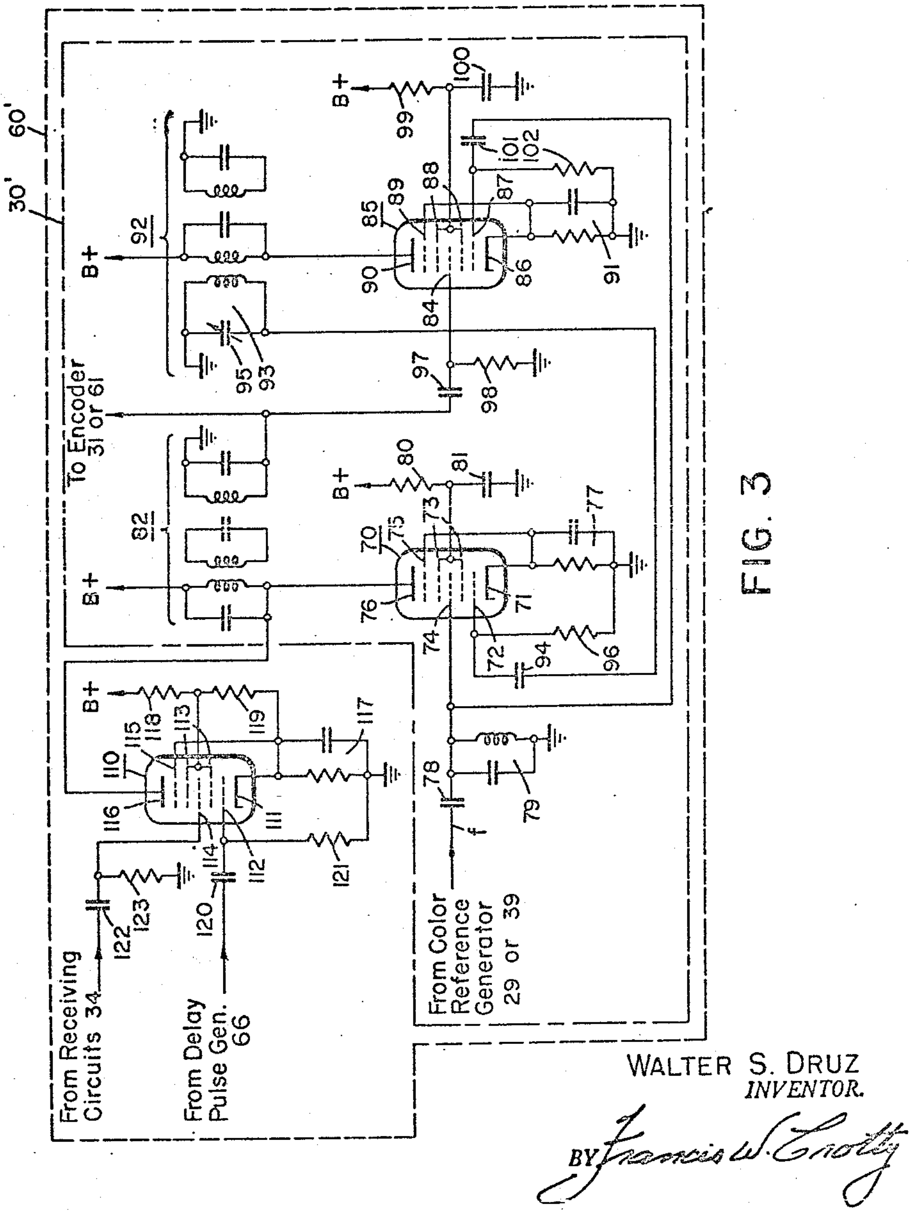
Figure 3 is a detailed schematic circuit diagram of one embodiment of one element of an encoding system useful in the transmitter and receiver illustrated in Figures 1 and 2.

Figure 3 illustrates a preferred form of second color-reference generator suitable for use as generator 60, Figure 2, and, with minor modifications, as generator 30, Figure 1. The circuit of Figure 3 may best be described as a regenerative frequency multiplier, where the term multiplier is used in its generic sense to indicate multiplication by a factor either greater or smaller than unity. Thus, the specific circuit of Figure 3, which has an overall multiplication factor less than unity, might also be termed a regenerative frequency divider.

The color-reference generator illustrated in Figure 3 includes a first electron-discharge device 70 of the pentagrid type, such as the commercially available type 6BE6. Tube 70 includes a cathode 71, a first control electrode 72, a pair of screen electrodes 73 encompassing a second control electrode 74, a suppressor electrode 75, and an anode 76. Cathode 71 is connected to a plane of reference potential, here indicated as ground, through a resistance-capacitance biasing network 77, and suppressor electrode 75 is directly connected to cathode 71. Second control electrode 74 is coupled to color-reference generator 29 or 39 (Figures 1 and 2 respectively) through a coupling capacitor 78 and a tuned circuit 79 which has a resonant frequency $f$ equal to the frequency of the color-reference signal developed in the first color-reference generator. Screen electrodes 73 are connected to each other and through a resistor 80 to a source of positive operating potential B+; the screen electrodes are also bypassed to ground through a capacitor 81. Anode 76 is connected to a triple-tuned output circuit 82 and to a source of positive unidirectional operating potential B+. Output circuit 82 is coupled to encoder 31 or 61 of Figures 1 and 2 respectively, depending on the application of the circuit.

Output circuit 82 is also coupled through a capacitor 97 and grid leak resistor 98 to the second control electrode 84 of a second electron-discharge device 85; device 85 may be essentially similar to tube 70 and may include, in addition to second control electrode 84, a cathode 86, a first control electrode 87, a pair of screen electrodes 88, a suppressor electrode 89, and an anode 90. Cathode 86 may be connected to ground through a suitable biasing network 91, and suppressor 89 is directly connected to cathode 86. Screen electrodes 88 are connected to each other, and, through a resistor 99, to potential source B+; screen grids 88 are bypassed to ground by means of a condenser 100. Anode 90 is preferably connected to a tuned output circuit 92 and to operating potential source B+. One of the tuned circuits 93 of output stage 92 is connected to first control electrode 72 of tube 70 through a coupling capacitor 94 and a grid leak resistor 96; tuned circuit 93 may include a variable capacitor 95 as will be explained hereinafter. First control electrode 87 is coupled to first color-reference generator 29 or 39 by means of a coupling capacitor 101 and a grid leak resistor 102.

For the second color-reference generator 60 of the receiver, it is desirable to include a gating circuit for phase synchronizing purposes; this circuit is not necessary in generator 30 of the transmitter. The synchronizing circuit comprises an electron discharge device 110 which may be similar to tubes 70 and 85. Tube 110 includes a cathode 111, a first control electrode 112, a pair of screen electrodes 113 encompassing a second control electrode 114, a suppressor electrode 115, and an anode 116. Cathode 111 is connected to ground through a suitable R–C network 117; suppressor 115 is connected to the cathode. Screen electrodes 113 are connected through a resistor 118 to positive operating potential source B+; the screen electrodes are also coupled to cathode 111 through a suitable bias resistor 119.

Control electrode 112 of device 110 is coupled to receiver delay pulse generator 66 (Figure 2) by a coupling capacitor 120 and a grid leak resistor 121. Similarly, a second control electrode 114 is coupled to receiving circuits 34 of the receiver by means of a coupling capacitor 122 and a resistor 123. Anode 116 is connected to one of the three tuned circuits of output stage 82 and is also connected to operating potential source B+.

When the regenerative frequency multiplier illustrated in Figure 3 is placed in operation, the color-reference signal developed by first color-reference generator 29 or 39 is applied to control electrode 74 of device 70 and to control electrode 87 of tube 85. The frequency $f$ of the first color-reference signal, according to present standards, is approximately 3.58 megacycles. In tube 70, the first color-reference signal is intermodulated with a second signal which has a frequency equal to a fractional multiple of $f$; for example, the signal applied to first control electrode 72 may have a frequency of $2f/5$. Consequently, the signal applied to output circuit 82 includes several frequency components including the input frequencies, their sum, and their difference; accordingly, the signal applied to output circuit 82 includes frequency components $f$, $2f/5$, $3f/5$, and $7f/5$. For the illustrated embodiment, output circuit 82 is tuned to the frequency $3f/5$ and this is employed as the frequency of the second color-reference signal and is supplied to encoder 31 or 61.

The second color-reference signal is also applied to control electrode 84 of tube 85 and is intermodulated in tube 85 with the input signal of frequency $f$. Output circuit 92 of tube 85 is tuned to a frequency of $2f/5$ and is coupled to control electrode 72 of tube 70 to provide the feedback signal required for operation of that device. It will be recognized that the regenerative multiplier circuit, just like many oscillators, depends upon transient responses to initiate operation; but, once started, it is extremely stable in operation.

For the second color-reference generator of the transmitter, unit 30 in Figure 1, the portion of Figure 3 included in dash outline 30′ is complete in itself. The circuit enclosed within outline 30′, once placed in operation, will lock itself in a fixed phase relationship with respect to the color-reference signal supplied from generator 29. However, there are several possible different phase relationships obtainable so that it is desirable to supply the receiver of Figure 2 with phasing information for color-reference generator 60. The circuit comprising tube 110 and included within outline 60′ is utilized for this purpose. The operating potentials for tube 110 are so chosen that the tube remains cut off except when relatively high-amplitude positive pulses are applied to first control electrode 112. The gating pulses from pulse generator 66 of Figure 2 are applied to grid 112 to make the tube conductive during intervals in which a synchronizing signal for the second color-reference signal occurs in the telecast radiated from the transmitter of Figure 1. At the same time, the composite color video signal is applied to second control electrode 114. Consequently, the control signal for the second color-reference signal is amplified in tube 110 and supplied to output circuit 82 during vertical retrace intervals to excite the output circuit at the correct frequency, here taken as $3f/5$, and in the proper phase. The phase conditions thus established are maintained by the regenerative multiplier circuit and the second color-reference signal developed at the receiver is thus locked in phase to the corresponding signal employed at the transmitter.

Triple-tuned circuits have been employed as load circuits in the regenerative frequency multiplier in order to preclude undesired translation of signals at frequencies other than those requisite to the proper operation of the circuit; use of these highly selective circuits is preferred since any disturbances in the frequency or phase of the second color-reference signal supplied to encoder 31 or 61 may lead to color contamination in the reproduced image. Variable capacitor 95 may be adjusted for fine tuning of circuit 93 to effectively discriminate frequency $2f/5$ for the signal applied to control electrode 72 of tube 70.

The color-reference generator or frequency multiplier illustrated in Figure 3 is relatively simple and economical in construction; nevertheless, its output signal is accurately controlled in frequency by the first color reference signal applied to control electrodes 74 and 87 of tube 70 and 85. Moreover, the regenerative frequency multiplier of Figure 3 maintains a fixed phase relationship between the received first color-reference signal and the output signal applied to secrecy encoder 31 or 61, the phase accuracy being well within the requirements of the NTSC system for preventing color contamination. Accordingly, it will be seen that use of the encoding system of the invention does not place any undue economic burden upon the manufacture of subscription color receivers adapted for use in the system. It will be understood that the particular frequency relationships described in connection with the illustrated embodiment are purely arbitrary and that, within the bandwidth limitations set forth above, virtually any frequency may be chosen for the second color-reference signal so long as the necessary frequency relationship with respect to the horizontal scanning frequency is maintained; that is, the second color-reference frequency should also be an odd integral multiple of one-half the line-scanning frequency.

Figure 4:
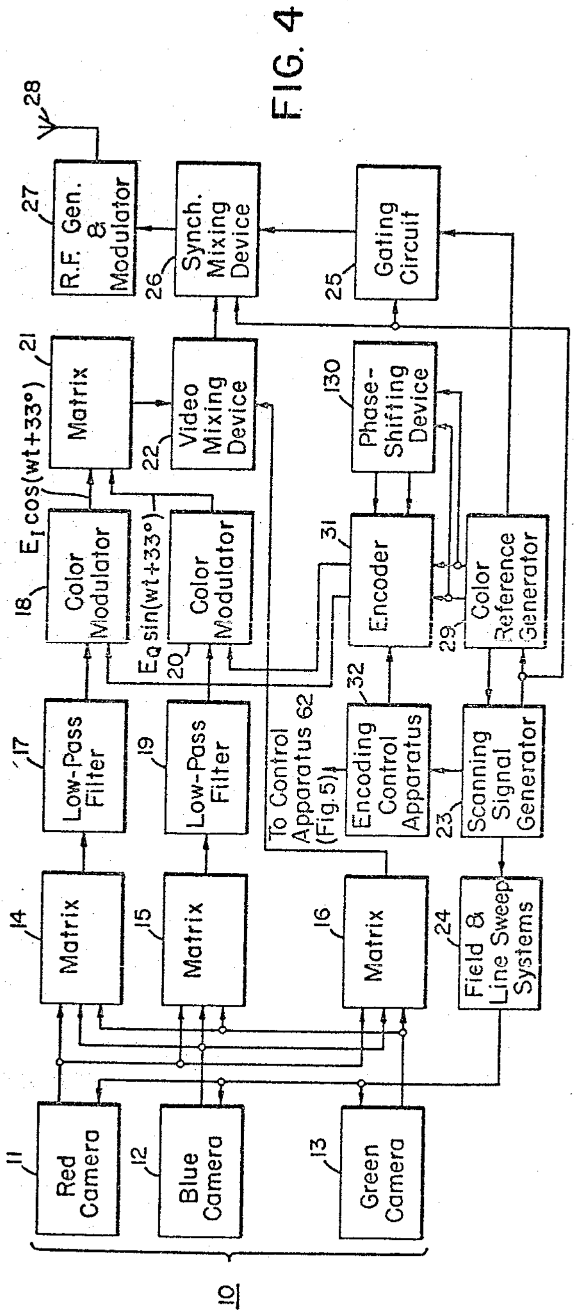
Figure 4 is a block diagram of another embodiment of a color television transmitter including a secrecy-encoding system constructed in accordance with the invention.

The transmitter embodiment illustrated in Figure 4 is in many respects essentially identical with that of Figure 1. As before, the transmitter comprises a camera system 10 including red, blue and green cameras 11, 12 and 13; the outputs of each of the cameras are individually coupled to matrices 14, 15 and 16. Matrix 14, which is employed to synthesize the color difference signal $E_I$, is coupled through low-pass filter 17 to color modulator 18, whereas the $E_Q$ matrix, matrix 15, is coupled through low-pass filter 19 through modulator 20. The two color modulators are each coupled to matrix 21, in which their output signals are combined to form the carrier color signal; matrix 21 is coupled to video mixing device 22 which is also coupled to the $E_Y$ matrix 16.

The scanning-signal generator 23 of the transmitter is coupled to field and line sweep systems 24 which are in turn coupled to each of the color cameras 11—13. Generator 23 is also interconnected with color-reference generator 29 and the outputs of both generators 23 and 29 are coupled to gating circuit 25. The synchronizing signals from generator 23 are also supplied to synchronizing signal mixer 26; mixing device 26 is also coupled to the outputs of video mixer 22 and gating circuit 25. The synchronizing signal mixer is coupled to RF generator and modulator 27 which, in turn, is connected to antenna 28.

It will be recognized that the structure of the transmitter of Figure 4, as thus far described, is identical with that of Figure 1 and that if color-reference generator 29 were directly coupled to color modulators 18 and 20, the transmitter would be entirely conventional in form. However, and as in the embodiment of Figure 1, the output of color-reference generator 29 is coupled to the color modulators through an encoder 31 which may comprise a simple two-position switch. The output of the color-reference generator is also coupled to a phase shifting device 130, which, in turn, is coupled to encoder 31. An encoding control apparatus 32 is coupled to scanning-signal generator 23 and encoder 31 as in the previously described embodiment.

The embodiment of Figure 4 takes advantage of the fact that any substantial phase shift in the color subcarrier or color reference signal which is not accompanied by a corresponding phase shift in the demodulating color-reference signal employed in a receiver gives rise to virtually complete unintelligibility of the color values of an image reproduced by that receiver. For this embodiment, a second color-reference signal having a frequency equal to that of the signal developed by color-reference generator 29 but of substantially different phase is developed in phase-shifting device 130. The phase-shifting device may be of any of the many suitable forms known in the art; perhaps the simplest form for the phase shifter comprises a pair of matched delay lines.

As in the embodiment of Figure 1, encoder 31 operates to supply either the first color-reference signal (from generator 29) or the second color-reference signal (from phase-shifting device 130) to color modulators 18 and 20 in accordance with a code schedule determined by control apparatus 32. For this embodiment, it is not usually necessary to add any phasing information concerning the second color-reference signal to the telecast, as will be more clearly understood from a consideration of the receiver encoding system illustrated in Figure 5.

Figure 5:
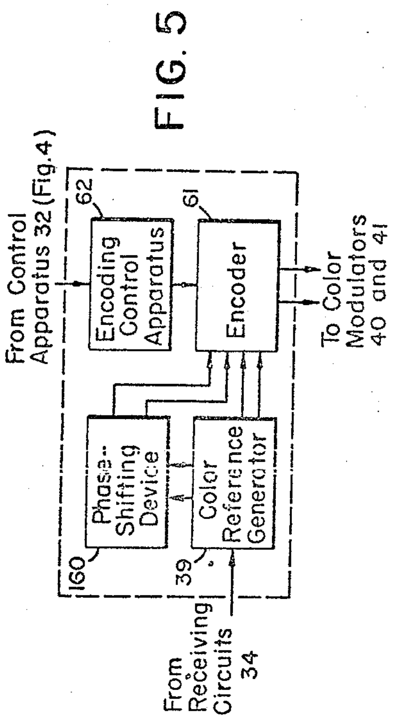
Figure 5 is a block diagram of a portion of a subscription color television receiver adapted to utilize the coded signal developed by the transmitter of Figure 4.

The apparatus shown in Figure 5 may be incorporated in the receiver illustrated in Figure 2 to adapt that receiver for use with the coded color telecast developed by the transmitter of Figure 4. The receiver color-reference generator 39 is again coupled to an encoder 61 which may comprise a two-position electronic switch. Encoder 61 is coupled to the output of encoding control apparatus 62, which may be linked to control aparatus 32 of the transmitter by any suitable means. Encoder 61 is coupled to the receiver color modulators 40 and 41, as in the previously-described receiver, and color-reference generator 39 is coupled to the output of receiving circuits 34. In this embodiment, however, there is no separate second color-reference generator. Rather, a phase-shifting device 160 is coupled to the output of color-reference generator 39, the output stage of the phase shifter being connected to encoder 61. Phase-shifting device 160 is preferably of the same general type as transmitter phase-shifting device 130 and may comprise delay lines or any other suitable phase-shifting means. Preferably, phase shifter 160 should be provided with means to vary the magnitude of the phase shift so that it may be made to correspond precisely to the change in phase effected by transmitter device 130.

In operation, the subscription system comprising the transmitter of Figure 4 and the receiver of Figure 2 as modified by incorporation of the apparatus of Figure 5 is essentially the same as that described above in connection with Figures 1 and 2, except that secrecy is provided solely by changes in phase of the color-reference signals rather than by the combined phase and frequency changes effected in the previously-described system. The system of Figures 4 and 5 is substantially simpler in form and may result in considerable savings in equipment required as compared to the frequency-changing embodiment. On the other hand, it is somewhat less effective insofar as secrecy is concerned and may require somewhat more skill on the part of the receiver user in order to achieve the necessary accurate phase relationship between the second color-reference signal developed in phase-shifting device 160 and the corresponding signal developed by transmitter phase shifter 130. Both systems achieve selective secrecy encoding of the color information without adversely affecting monochrome reception and thus make it possible to distinguish between these two types of reception for subscription purposes.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. A color television secrecy encoding system comprising: a pair of color modulators each adapted to modulate a color-intelligence signal with a selected phase component of a color-reference signal to develop a modified color-intelligence signal; means for applying color-intelligence signals to said color modulators; a color-reference generator for generating a first color-reference signal of a predetermined frequency; means, coupled to said color-reference generator, for utilizing said first color-reference signal to develop a second color-reference signal having a predetermined phase and frequency relationship with respect to said first color-reference signal; a secrecy encoder for selectively coupling said color-reference generator and said last-mentioned means to said color modulators, said encoder being actuatable from a first mode of operation in which said first color-reference signal is translated to said modulators to a second mode of operation in which only said second color-reference signal is applied to said modulators; and a control apparatus, coupled to said encoder, for actuating said encoder between said modes of operation in accordance with a preselected code schedule.

2. A color television secrecy-encoding transmission system comprising: a pair of color modulators each adapted to modulate a color-difference signal with a selected phase component of a color-reference signal to develop a modified color-difference signal; means for individually applying two color-difference signals to said color modulators; a color-reference generator for generating a first color-reference signal of a predetermined frequency; means, coupled to said color-reference generator, for utilizing said first color reference signal to develop a second color-reference signal having a predetermined phase and frequency relationship with respect to said first color-reference signal; a secrecy encoder for selectively coupling said color-reference generator and said last-mentioned means to said color modulators, said encoder being actuatable from a first mode of operation in which said first color-reference signal is translated to said modulators for modulation with said color-difference signals to form two modified color-difference signals to a second mode of operation in which said second color-reference signal is applied to said modulators for modulation with said color-difference signals to form two alternate modified color-difference signals; a control apparatus, coupled to said encoder, for actuating said encoder between said modes of operation in accordance with a preselected code schedule; and matrix means coupled to said two color modulators to combine said modified color-difference signals to develop a coded carrier color signal.

3. A color television secrecy-encoding receiving system comprising: a pair of color modulators each adapted to modulate a carrier color signal with a selected phase component of a color-reference signal to develop a color-difference signal; means for applying a coded carrier color signal to both of said color modulators; a color-reference generator for generating a first color-reference signal of a predetermined frequency; means, coupled to said color-reference generator, for utilizing said first color-reference signal to develop a second color-reference signal having a predetermined phase and frequency relationship with respect to said first color-reference signal; a secrecy encoder selectively coupling said color-reference generator and said last-mentioned means to said color modulators, said encoder being actuatable from a first mode of operation in which selected phase components of only said first color-reference signal are translated to said modulators for modulation with said coded carrier color signal to a second mode of operation in which selected phase components of only said second color-reference signal are applied to said modulators for modulation with said coded carrier color signal; and a control apparatus, coupled to said encoder, for actuating said encoder between said modes of operation in accordance with a preselected code schedule to decode said coded carrier color signal.

4. A color television secrecy encoding system comprising: a pair of color modulators each adapted to modulate a color-intelligence signal with a selected phase component of a color-reference signal to develop a modified color-intelligence signal; means for applying color-intelligence signals to said color modulators; a first color-reference generator for generating a first color-reference signal of a first predetermined frequency; a second color-reference generator, coupled to said first color-reference generator, for utilizing said first color-reference signal to develop a second color-reference signal of a different frequency smaller than twice said first frequency and greater than one-half said first frequency; an encoder selectively coupling said first and second color-reference generators to said color modulators, said encoder being actuatable from a first mode of operation in which only said first color-reference signal is translated to said modulators to a second mode of operation in which only said color-reference signal is applied to said modulators; and a control apparatus, coupled to said encoder, for actuating said encoder between said modes of operation in accordance with a preselected code schedule.

5. A color television secrecy encoding system comprising: a pair of color modulators each adapted to modulate a color-intelligence signal with a selected phase component of a color-reference signal to develop a modified color-intelligence signal; means for applying color-intelligence signals to said color modulators; a first color-reference generator for generating a first color-reference signal of a first predetermined frequency; a second color-reference generator, comprising a regenerative frequency multiplier coupled to said first color-reference generator, for utilizing said first color-reference signal to develop a second color-reference signal of a different frequency smaller than twice said first frequency and greater than one-half said first frequency; an encoder selectively coupling said first and second color-reference generators to said color modulators, said encoder being actuatable from a first mode of operation in which only said first color-reference signal is translated to said modulators to a second mode of operation in which only said second color-reference signal is applied to said modulators; and a control apparatus, coupled to said encoder, for actuating said encoder between said modes of operation in accordance with a preselected code schedule.

6. A color television secrecy-encoding system comprising: a pair of color modulators each adapted to modulate a color-intelligence signal with a selected phase component of a color-reference signal to develop a modified color-intelligence signal; means for applying color-intelligence signals to said color modulators; a color-reference generator for generating a first color-reference signal of a predetermined frequency; phase-shifting means, coupled to said color-reference generator, for utilizing said first color-reference signal to develop a second color-reference signal having a frequency equal to said predetermined frequency and having a predetermined fixed phase relationship with respect to said first color-reference signal; a secrecy encoder selectively coupling said color-reference generator and said phase-shifting means to said color modulators, said encoder being actuatable from a first mode of operation in which only said first color-reference signal is translated to said modulators to a second mode of operation in which only said second color-reference signal is applied to said modulators; and a control apparatus, coupled to said encoder, for actuating said encoder between said modes of operation in accordance with a preselected code schedule.

7. A color television secrecy encoding system comprising: a color-modulating system adapted to modulate a color-intelligence signal with a selected phase component of a color-reference signal to develop a modified color-intelligence signal; means for applying color intelligence signals to said color modulating system; a color-reference generator for generating a first color-reference signal of a predetermined frequency; means coupled to said color-reference generator for utilizing said first color-reference signal to develop a second color-reference signal having a predetermined phase and frequency relationship with respect to said first color-reference signal; a secrecy encoder, coupled to said color-reference generator and to said last-mentioned means, said encoder being actuatable from a first mode of operation in which said first color-reference signal is translated to said modulating system to a second mode of operation in which said second color-reference signal is applied to said modulating system; and a control apparatus, coupled to said encoder, for actuating said encoder between said modes of operation.

References Cited in the file of this patent

UNITED STATES PATENTS

| | | |
|---|---|---|
| 2,521,010 | Homrighous | Sept. 5, 1950 |
| 2,619,530 | Roschke | Nov. 25, 1952 |

OTHER REFERENCES

Electronics magazine for February 1952, pages 88–97.